United States Patent [19]

McCray

[11] 3,976,570

[45] Aug. 24, 1976

[54] METHOD AND APPARATUS FOR REMOVING CONTAMINANTS FROM THE SURFACE OF A BODY OF WATER

[76] Inventor: Arthur W. McCray, 1110 Grove Lane, Norman, Okla. 73069

[22] Filed: Apr. 18, 1975

[21] Appl. No.: 569,261

Related U.S. Application Data

[63] Continuation of Ser. No. 404,111, Oct. 5, 1973, abandoned.

[52] U.S. Cl. ................................ 210/30 A; 210/40; 210/242 AS; 210/DIG. 26; 233/25

[51] Int. Cl.[2] ........................................... C02B 1/14

[58] Field of Search ................ 34/58; 210/30 A, 40, 210/242 AS, DIG. 21 P, 36; 233/25; 273/58 R, 58 A, 58 B, 58 D, 219

[56] References Cited

UNITED STATES PATENTS

| | | | |
|---|---|---|---|
| 1,566,770 | 12/1925 | Packer | 233/25 |
| 3,598,729 | 8/1971 | Baumann | 210/DIG. 21 P |
| 3,630,891 | 12/1971 | Peterson et al. | 210/DIG. 21 P |
| 3,657,125 | 4/1972 | Strickman | 210/40 |
| 3,666,098 | 5/1972 | Garland et al. | 210/DIG. 21 P |
| 3,702,657 | 11/1972 | Cunningham et al. | 210/242 OA |
| 3,723,307 | 3/1973 | Hunter | 210/40 |
| 3,739,913 | 6/1973 | Bogosian | 210/242 OA |

*Primary Examiner*—Charles N. Hart
*Assistant Examiner*—Ivars Cintins
*Attorney, Agent, or Firm*—Richards, Harris and Medlock

[57] ABSTRACT

A method and apparatus for removing oil or other hydrocarbons from the surface of a body of water by the distribution of discrete buoyant porous member upon the water surface, continuously removing the members from the surface, removing the absorbed oil from the members in a recovery assembly, and returning the members to the surface of the water for reuse. The members are rigid, porous spheres with oleophilic hydrophobic material herein. The recovery assembly includes a housing having a rotating frame therein with a wheel rotatably mounted thereon for carrying a plurality of members. A motor rotates the wheel and frame and a feed successively feeds members into the rotating wheel for centrifuging. A discharge removes the balls from the wheel after a set period of time and returns the balls to the surface of the water.

16 Claims, 6 Drawing Figures

METHOD AND APPARATUS FOR REMOVING CONTAMINANTS FROM THE SURFACE OF A BODY OF WATER

This is a continuation of application Ser. No. 404,111, filed Oct. 5, 1973, now abandoned.

The present invention relates to improvements in apparatus and methods for removing hydrocarbon compounds from the surface of a body of water.

The presence of hydrocarbon compounds, such as crude oil, fuel oil, and the like, presents a serious water pollution problem. Oil contaminants on the surface of the water can be deposited by diesel-powered ships which spill and discharge these waters during operation. In addition, spills occur in harbors and off-shore in the drilling, production and transportation of crude oils and other hydrocarbon compounds.

These spills can produce problems in that the compounds must be removed before contamination of the sea bottom and adjacent shore line occurs. Although some hydrocarbon compounds float on the surface of a body of water, their removal therefrom can be difficult due to the existence of wave action which may interfere with an efficient confinement of an oil slick and due to the fact that mechanical separation of oil from a water surface is very difficult to achieve.

Various methods have been suggested to remove spilled hydrocarbons from the surface of water, but these methods have not under all surface conditions proved completely satisfactory. Some of these methods have employed the use of chemicals to cause the sinking or dispersion of the oil, burning of the oil, skimming the oil from the surface, suction devices, and the dispersion of oil-absorbent materials and their subsequent removal from the water. An example of one of these methods is in Pat. No. 3,581,899.

Each of the methods in the prior art present limitations. Chemically caused sinking or dispersion of the oil pollutes the water and the sea bottom. Burning or incineration is objectionable because of atmospheric pollution and because of the difficulty in maintaining the oil slick at a temperature high enough to sustain combustion. Skimming processes capable of removing large quantities of oil at a high rate undesirably require large and expensive equipment. Devices which disperse porous compressible members in the spill area undesirably require that once the compressible members have absorbed a portion of the oil, that they are lifted from the sea water. Due to their lack of rigidity, a portion of the oil will be lost from the members due to partial compression of the members during handling.

According to the present invention, an apparatus is provided for removing hydrocarbon compounds from the urface of the body of the water by using a plurality of porous members of oleophilic hydrophobic material surrounded by a rigid covering to prevent loss of oil therefrom during handling. Provided in combination with the improved discrete members is an improved centrifuging apparatus which removes the oil from the members by applying centrifugal forces thereto.

The advantages and features of the present invention will become apparent from the following Detailed Description when considered in connection with the accompanying Drawings in which.

DESCRIPTION OF THE PREFERRED EMBODIMENT

Figure 1:
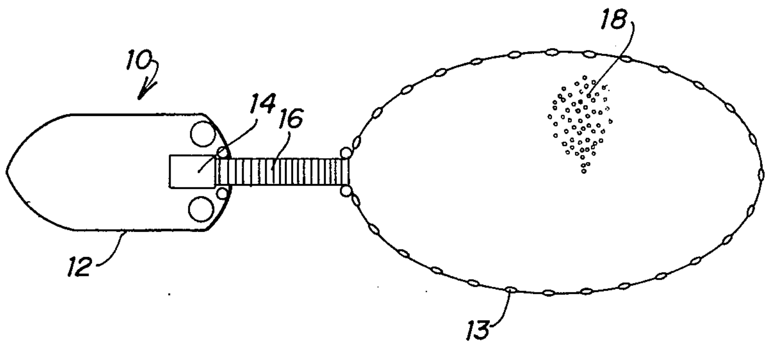
FIG. 1 is a plan view of the apparatus of the present invention illustrated removing hydrocarbon compounds from the surface of a body of water.
Figure 4:
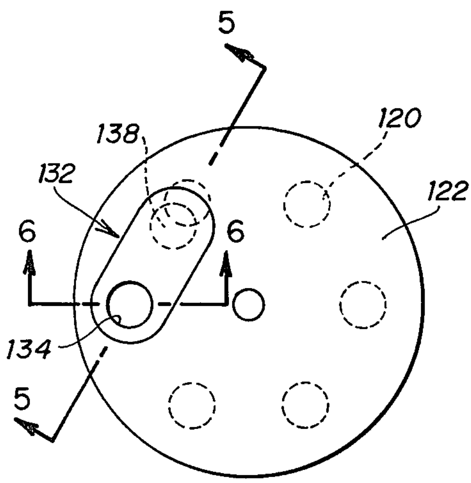
FIG. 4 is an enlarged longitudinal section of the device taken on line 4—4 of FIG. 3 looking in the direction of the arrows.

Referring now to the Drawings wherein like reference characters designate like or corresponding parts throughout the several views, there is illustrated in FIG. 1 an apparatus 10 for collecting a quantity of liquid from the surface of a body of water.

The apparatus is especially adapted for use in collecting and removing hydrocarbons, such as oil floating on or dispersed near the surface of the body of water. It can be used when the body of water is still or when waves are present thereon. The apparatus 10 operates by first depositing a plurality of discrete rigid members 18 on the surface of the water which absorb the oil. The members 18 can then be removed from the water and the hydrocarbons removed therefrom. The members 18 can then be returned to the water for reuse.

The discrete members 18 can be used to absorb the hydrocarbons in the water in a plurality of different ways. For example, they can be placed in the water in a polluted area, and after they have absorbed a quantity of oil, they can be gathered manually for cleaning. Second, the members 18 could be confined inside a floating net or barrier, which may be stationary, or towed through the polluted areas. After absorbing the oil, the members 18 can be removed manually or mechanically as by a small conveyor and thereafter have the oil removed therefrom. Third, the members 18 could be placed inside a horizontal cylindrical cage mounted on the front of a barge. The cage can be rotated and the barge moved through the polluted area as the members 18 absorb the oil. The rotation of the cage together with a suitable internal guide means could be used to provide continuous introduction of clean members 18 into one end of the cage and removal of the members 18 which have absorbed oil from the other end. These removed members 18 could then be cleaned and returned to the cage in a continuous cycle. Other systems and methods of using the rigid discrete members 18 to recover oil from the surface of a body of water could be utilized.

In the disclosed apparatus 10, a suitable vessel 12 such as a ship or barge is provided. This vessel 12 is moved in the water to a point adjacent to the hydrocarbon contamination. A barrier 13 can be provided for floating on the surface of the water. This barrier 13 is positioned to surround the contaminant to be removed from the surface of the water. The barrier 13 performs the function of containing the contaminant within a defined area and containing the discrete members 18 which are placed in the water to absorb the contaminant. In addition, the barrier 13 can be attached to and towed by the vessel 12 if the area of contamination is of a sufficient size to allow the discrete members to be pulled through the contaminated area while remaining confined within the barrier 13.

A recovery assembly 14 is mounted on the vessel 12 for use in removing the oil absorbed by the discrete members 18. The assembly 14 is provided with a conveyor 16 for lifting the members 18 from the surface of the water and transporting them to the assembly 14.

Figure 2:
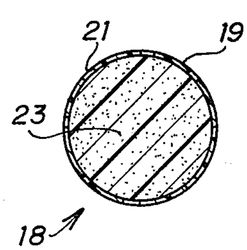
FIG. 2 is a section of one of the discrete members.
Figure 3:
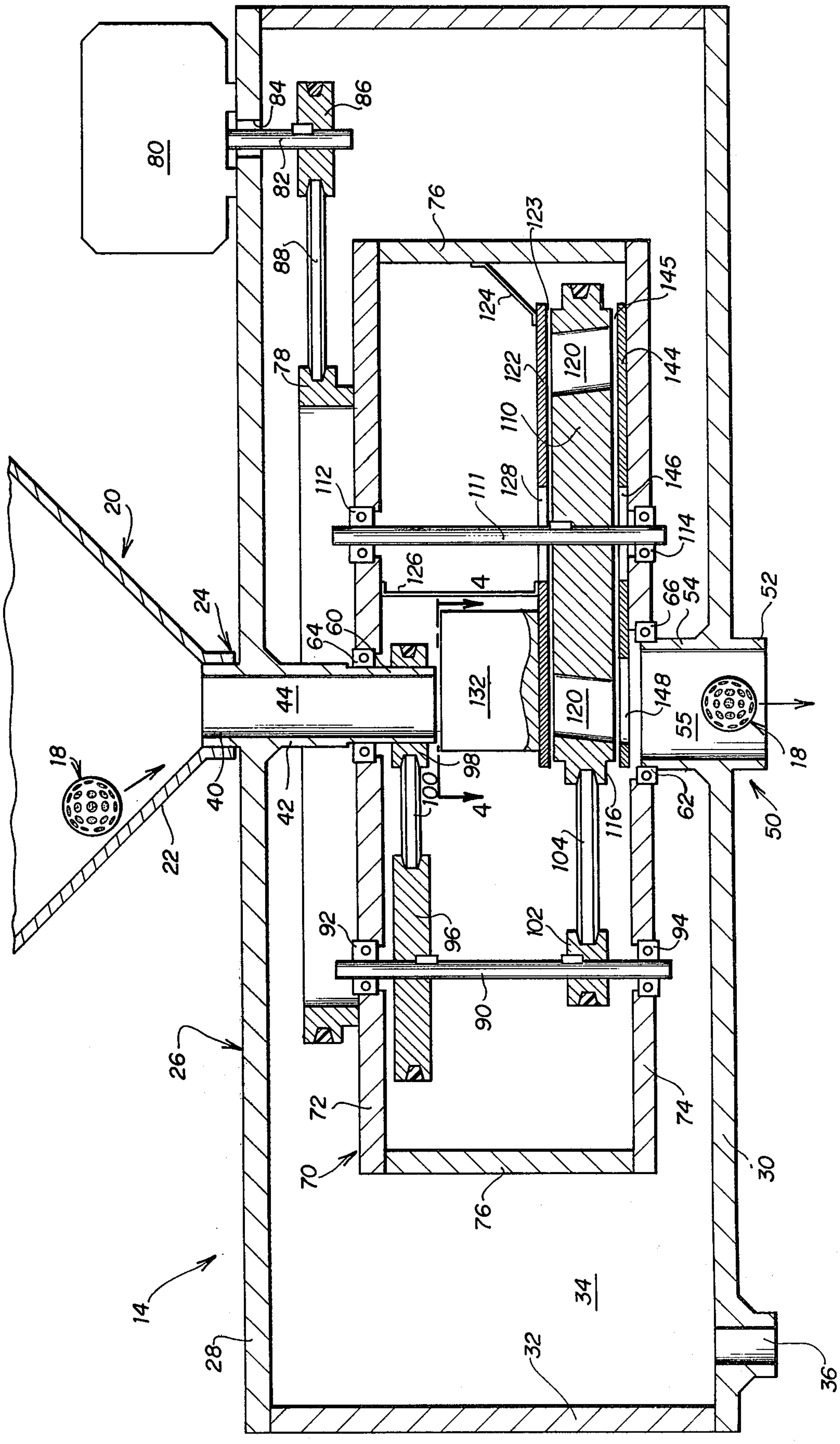
FIG. 3 is a section of the recovery assembly of the present invention.

In the present embodiment, a plurality of separate discrete spherical balls are used as members 18 to absorb the hydrocarbons in the water. A preferred embodiment for these members is illustrated in FIG. 2. The members 18 have an outer spherical shell 19 which gives the members 18 a sufficient rigidity. This outer shell can be rubber or plastic material and is provided with a plurality of holes, bores or other openings 21 which allow liquids to enter and leave the spherical chamber defined within the shell 19. The chamber of shell 19 is filled with porous polyurethane foam or other suitable material 23 which is oleophilic and hydrophobic. This material 23 can then be used to wick or absorb the contaminant from the surface of the water while repelling the absorption of water.

If desired, a small air-filled ball can in some cases be provided inside the material 23 to add sufficient buoyancy to the members 18 to insure floating in the water.

According to a particular feature of the present invention, the oil-absorbing material 23 is enclosed within the perforated shell 19. Water and oil can then pass through the perforation so that oil can be absorbed by the material 23. In addition, movement of the water into the members 18 will be relatively gentle, to help retain oil in the material 23. In addition, the rigidity of shell 19 prevents the oil from being squeezed back out of the material 23 by wave action or by forces created during handling of the members 18. These members 18 have been described as being spherical in shape and it is to be understood, of course, that other shapes could be utilized as desired without departing from the invention as described herein.

In operation, the members 18 are placed on the surface of the water where they absorb spilled hydrocarbon compounds. The conveyor 16 is used to remove the members 18 from the water and transfer the same to the liquid recovery assembly 14 located on the vessel 12. The liquid recovery assembly 14 can then remove absorbed oil from the members 18 as will be hereinafter described in more detail. The members 18 can then be returned to the surface of the water to absorb additional oil and repeat the cycle as many times as necessary.

Turning now to FIGS. 3–6, the details of the liquid recovery assembly 14 are illustrated. This assembly 14 has a hopper 20 into which the members leaving the conveyors 16 fall. The hopper 20 is of a gravity feed type with a tapered lower portion 22 for guiding the balls into an upper central feed tube 24. This upper feed tube 24 is centrally positioned on a housing 26 which is in turn mounted on the vessel 12.

The housing 26 is provided with circular upper and lower walls 28 and 30, respectively, and a cylindrical side wall 32. These walls 28, 30 and 32 define a sealed cylindrical chamber 34 therein. The walls 28, 30 and 32 can be suitably attached together but should be provided with means to allow access to chamber 34 to service and assemble the hereinafter described equipment therein. A drain 36 is provided in the housing 26 to remove oil or other liquids which may collect within the chamber 34.

The upper feed tube 24 is centrally mounted on the upper wall 28. A portion 40 extends above the surface of wall 28 and a portion 42 extends into the interior of chamber 34. The feed tube 24 is rigidly attached to the wall 28 and is provided with a cylindrical passage 44 of a sufficient diameter to allow the passage of members 18 therethrough by gravity feed.

A lower discharge tube 50 is centrally mounted in the lower wall 30. This tube has a portion 52 which extends to the ouside of lower wall 30 and a portion 54 which extends into the interior of chamber 34. A cylindrical passage 55 is provided in tube 50 and is of sufficient diameter to allow the passage of members 18 therethrough. The tubes 24 and 50 are coaxially aligned.

The portion 42 of tube 24 is provided with reduced diameter portion 60. The portion 54 of tube 50 is likewise provided with a reduced diameter portion 62. Bearings 64 and 66 are mounted, respectively, on portions 60 and 62. A frame assembly 70 is rotatably supported by bearings 64 and 66 within chamber 34. The assembly 70 is formed from a rectangular upper beam member 72 and a rectangular lower beam member 74. The beam members 72 and 74 are attached to bearings 64 and 66, respectively. Spacer bars 76 rigidly attach members 72 and 74 in spaced parallel relationship. A pulley member 78 is fixed on the upper surface of beam 72 concentrically with the bearing 64.

An electric motor 80 is fixed on the exterior of the upper wall 28 and has a drive shaft 82 which extends through a bore 84 in the upper wall 28. A suitable drive pulley 86 is keyed to rotate with drive shaft 82 and engages an endless belt 88 which is in turn entrained on pulley member 78. Thus by operating the motor 80, the shaft 82 and pulley 86 will be rotated which in turn rotates pulley member 78 and assembly 70. The relative sizes of pulleys 86 and 78 are selected so that a high-speed rotation of the shaft 82 will produce a corresponding low speed rotation of the assembly 70. It is to be understood, of course, that by selecting the sizes of these pulleys, the speed of rotation of the assembly 70 could be varied as desired.

An idler shaft 90 is rotatably attached to assembly 70 by an upper bearing 92 in member 72 and a lower bearing 94 in member 74. A pulley 96 is keyed to rotate with the idler shaft 90. A pulley 98 is fixed to the reduced diameter portion 60 of tube 24. An endless belt 100 is entrained between the pulleys 96 and 98 such that rotation of assembly 70 with respect to pulley 98 will cause rotation of idler shaft 90. A second pulley 102 is keyed to rotate with shaft 90 and is located below pulley 96. An endless belt 104 is entrained on pulley 102.

A shaft 111 carrying a wheel 110 is rotatably mounted on assembly 70 by means of an upper bearing 112 and a lower bearing 114. A pulley 116 is fixed on the exterior of the wheel 110 and engages and is rotated by endless belt 104. Thus it can be seen that by rotating assembly 70 by means of motor 80, wheel 110 will be caused to rotate with respect to the assembly 70 by means of pulley 98, belt 100, pulley 96, idler shaft 90, pulley 102, endless belt 104, and pulley 116. The selection of the diameter of the various pulleys can be chosen as desired to accomplish the desired speed of rotation of the wheel 110.

Wheel 110 is provided with a plurality of cylindrical bores 120 which extend completely through the wheel 110. These bores 120 are angularly spaced around the wheel and taper in an outward and downward direction as shown. These bores 120 are of a sufficient diameter to receive the members 18 therein.

An upper guard 122 is fixed to and rotates with assembly 70. Supports 124 and 126 are fixed between guard 122 and assembly 70. This upper guard 122 has a clearance opening 128 to allow shaft 111 to extend therethrough. The guard 122 is positioned adjacent to the upper surface of the wheel 110 and defines a space 123 therebetween. A feed opening 130 is provided to allow members 18 to enter the bores 120. This feed opening 130 is positioned to align with the bores 120 in wheel 110 as wheel 110 rotates with respect to frame 70 and guard 122.

Figure 5:
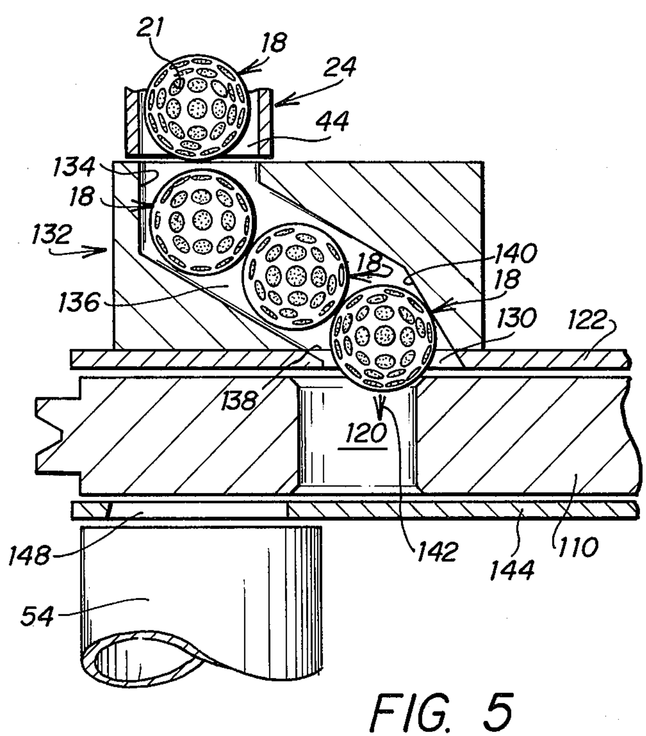
FIG. 5 is an enlarged section view taken on line 5—5 of FIG. 4 looking in the direction of the arrows.
Figure 6:
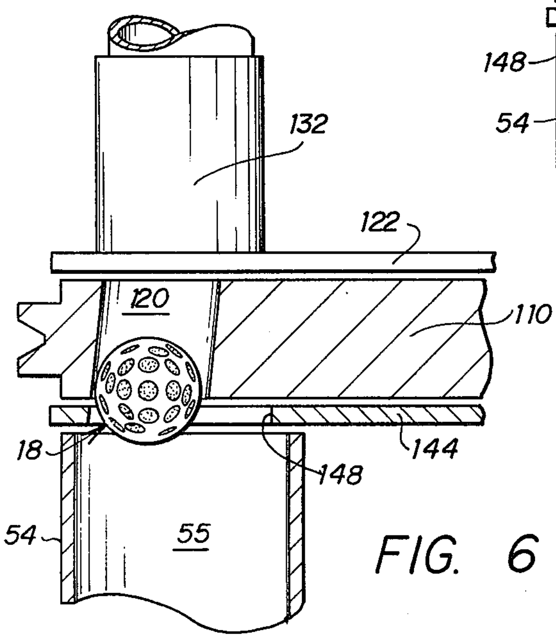
FIG. 6 is an enlarged section view taken on line 6—6 of FIG. 4 looking in the direction of the arrows.

A feed section 132 is attached to the guard 122 below the lower end of tube 24. The feed section 132, as can be seen in FIG. 5, has an upper opening 134 aligned with passageway 44 for receiving members 18 from the lower end of tube 24. A passageway 136 communicates between the upper opening 134 and a lower discharge opening 138. Opening 138 is aligned with feed opening 130 of guard 122. An inclined surface 140 is provided adjacent the lower end of the discharge opening 138 to force the members 18 to move in the direction of arrow 142 when one of the bores 120 aligns with the feed opening 130.

A lower guard 144 is attached to member 74 and is positioned below and adjacent to wheel 110. A space 145 is formed between wheel 110 and guard 144.

Thus, in operation, as the wheel 110 is rotated with respect to the guard 122, members 118 will successively drop into bores 120 as they pass opening 130. The members will be carried by the wheel 110 and will be held in the bores 120 by the upper and lower guards 122 and 144, respectively. The lower guard 144 is provided with a clearance opening 146 for the shaft 111 and an exit opening 148 which aligns with the passageway 55 of tube 50.

The opening 148 is angularly displaced from the opening 138 such that the members 18 will drop from the bores 120 of the wheel 110 prior to the bores becoming aligned with the opening 138 and the receipt of a new member 18 is therein. The members 18 then pass through passageway 55 and can be returned to the water to be used as desired.

As it can be seen, the members 18 containing absorbed liquid, such as oil, enter the hopper 20 and subsequently move through passageway 44 and into one of the bores 120. Thereafter, rotation of the apparatus causes the balls to move from the position adjacent to tubes 24 and 50 to a position adjacent to the periphery of the assembly 70 and away from the axis of rotation where centrifugal force will act upon the members 18 causing the oil absorbed therein to be forced out and flow through the spaces 123 and 145. The oil then flows to the walls of chamber 34 and out drain 36 to be disposed of as desired.

The rotation of the wheel 110 can be selected to be one-tenth of that of the assembly 70 such that the members 18 are subjected to ten rotations of assembly 70 while supported in the wheel 110. If it is desired that the assembly operate in a faster speed, a suitable wedged member (not shown) could be provided at the opening 148 to engage the balls and drive them in a downward direction into the passageway 55. A suitable groove could be provided in the lower face of the wheel 110 to prevent interference between this wedge and the wheel 110.

The foregoing description describes a system for collecting hydrocarbon compounds from the surface of a body of water in which discrete porous rigid members are used to absorb the oil. A recovery assembly is described for removing the absorbed contaminant from the members by use of centrifugal force eliminating the necessity of the use of undesirable compressible members.

It is to be understood, of course, that the foregoing description relates only to preferred embodiments of the present invention and that numerous modifications and alterations can be made therein without departing from the spirit and scope of the invention as set forth in the appended claims.

What is claimed is:

1. A method of removing liquid hydrocarbon contaminants from the surface of a body of water comprising:

providing a plurality of substantially rigid shell members each substantially spherical in shape and each having an outer shell having a plurality of substantially circular holes formed therein, said shell members being substantially filled with a quantity of liquid hydrocarbon absorbent material, said outer shell having sufficient rigidity to prevent the liquid contaminant from being squeezed back out of said absorbing material by movement of said absorbent members in the water or during handling of said members;

distributing the shell members having the absorbent material contained therein onto the surface of a body of water having liquid hydrocarbon contaminants floating thereon and thereby absorbing the liquid hydrocarbons into the absorbent material within the shell members;

recovering the shell members having the absorbent material contained therein from the surface of the body of water; and removing the liquid hydrocarbons from the absorbent material while the material remains positioned within the shell members.

2. The method of removing liquid hydrocarbon contaminants according to claim 1 wherein the step of removing the liquid hydrocarbons from the absorbent material is carried out by centrifuging the shell members with the absorbent material contained therein.

3. The method of removing liquid hydrocarbon contaminants according to claim 2 wherein the centrifuging step is carried out by individually centrifuging each of the shell members with the absorbent material contained therein.

4. The method of removing liquid hydrocarbon contaminants according to claim 3 wherein the centrifuging step is further characterized by:

guiding each shell member having the absorbent material contained therein through an opening substantially aligned with the axis of rotation of a rotating housing;

individually receiving each shell member having the absorbent material contained therein in a centrifuged chamber;

rotating the centrifuged chamber, the shell member contained therein and the absorbent material contained within the shell member about an axis of rotation substantially offset from the axis of rotation of the housing; and subsequently discharging the shell member and the absorbent material contained therein from the centrifuged chamber through an opening formed in the housing and substantially aligned with the axis of rotation of the housing.

5. The method of removing liquid hydrocarbon contaminants according to claim 1 wherein the shell member is substantially filled with an oleophilic, hydrophobic material.

6. A method of removing liquid hydrocarbon materials from the surface of a body of water comprising:

providing a plurality of hollow, substantially rigid, substantially spherical shell members each having a plurality of substantially circular holes formed therein;

positioning a quantity of oleophilic, hydrophobic material within each spherical shell member;

depositing the spherical shell members having the oleophilic, hydrophobic material contained therein on the surface of a body of water having liquid hydrocarbon materials floating thereon and thereby absorbing the liquid hydrocarbon materials in the oleophilic, hydrophobic material;

removing the spherical shell members having the oleophilic, hydrophobic material contained therein from the surface of the body of water;

subsequently guiding each spherical shell member having the oleophilic, hydrophobic material contained therein into a chamber individual thereto;

moving the individual chamber to the outer zone of a rotating frame thereby individually centrifuging each spherical shell member with the oleophilic, hydrophobic material remaining therein and thereby removing the liquid hydrocarbon material from the oleophilic, hydrophobic material within the spherical shell members; and subsequently guiding each spherical shell member with the oleophilic, hydrophobic material remaining therein out of its respective centrifuging chamber.

7. The method of removing liquid hydrocarbon materials from the surface of a body of water according to claim 6 further characterized by the step of providing each spherical shell member - oleophilic, hydrophobic material assembly with an overall density such that the assembly will float on the surface of the body of water.

8. The method of removing liquid hydrocarbon materials from the surface of a body of water according to claim 6 wherein the step of positioning oleophilic, hydrophobic material within the spherical shell members is further characterized by substantially filling each spherical shell member with oleophilic, hydrophobic material.

9. The method of removing liquid hydrocarbon materials from the surface of a body of water according to claim 6 wherein the steps of guiding the spherical members having the oleophilic, hydrophobic material contained therein are both carried out under the action of gravity whereby the spherical configuration of the shell members facilitates the movement thereof into and out of their respective centrifuge chambers.

10. The method of removing liquid hydrocarbon materials from the surface of a body of water according to claim 6 wherein the guiding steps are further characterized by directing each spherical shell member having the oleophilic, hydroscopic material contained therein through an opening formed substantially on the axis of rotation of a rotating housing and hence into the centrifuge chamber individual thereto, subsequently rotating the centrifuge chamber about an axis substantially offset from the axis of rotation of the housing, and subsequently discharging the spherical shell member having the oleophilic, hydrophobic material contained therein through an opening positioned substantially on the axis of rotation of the housing.

11. A system for removing a liquid hydrocarbon compound contaminant from the surface of a body of water comprising:

a plurality of discrete liquid contaminant absorbent members for being dispersed upon the water, said absorbent members being buoyant in water and including an outer rigid shell having apertures therethrough and filled with hydrocarbon compound absorbing material;

means for collecting said members from said water after absorption by said absorbing material of a desired amount of liquid contaminant through said apertures; and means for receiving said absorbent members from said collecting means and for centrifuging said members to remove the absorbed contaminant therefrom through said apertures;

said centrifuging means comprising:

a stationary housing, a frame disposed within said stationary housing and rotatable about a central axis, means for rotating said frame, a wheel mounted on said frame for rotation about an axis substantially offset from said central axis and including apertures therein for receiving adjacent the central axis of said frame individual rigid shell members having the absorbent material therein, guide means on the housing for guiding the rigid shell members having the absorbent material therein into the apertures of the wheel, and means for rotating said wheel such that said members received within said apertures in said wheel are carried to the outer extremity of said frame whereby centrifugal force removes the contaminant from said members and thereafter returned for discharge adjacent the central axis of said frame.

12. The system of claim 11 wherein said hydrocarbon compound absorbing material comprises oleophilic hydrophobic material.

13. The system of claim 11 further comprising:

means for receiving said members after centrifuging and for redispersing said absorbent members over the body of water.

14. The system of claim 11 and further comprising drive mechanisms for rotating said wheel at a rate slower than that of the rotating frame, thereby subjecting said members to centrifugal force during several revolutions of the frame in the course of a single revolution of said wheel.

15. The system of claim 11 wherein said apertures are disposed about the periphery of said wheel and are disposed through said wheel at an angle to the axis of said wheel, wherein centrifugal force tends to move said members from said apertures.

16. A system for removing oil from the surface of a body of water comprising:

a plurality of discrete oil-absorbent members having an outer rigid shell with apertures therethrough and oleophilic material enclosed within said rigid shell;

means for dispensing said absorbent members on the surface of the water to thereby absorb the oil and for collecting the resulting oil-filled members;

a stationary housing mounted on a vessel and including structure for receiving said oil-filled members;

a frame disposed within said stationary housing and rotatable about a central axis;

power means for rotating said frame;

a rotatable wheel eccentrically mounted on said frame and having apertures about the periphery thereof for receiving said rigid shell absorbent members, said wheel being positioned on said frame such that the rotation of said wheel carries said absorbent members from a central region of said frame to the outer periphery of said frame; and drive means associated with said frame for rotating said wheel simultaneously with the rotation of said frame, whereby said absorbent members are carried to the outer periphery of said rotating frame during rotation of said frame and said wheel, thereby subjecting said absorbent members to a centrifugal force to remove the oil therefrom.

* * * * *

PO-1050
(5/69)

UNITED STATES PATENT OFFICE
CERTIFICATE OF CORRECTION

Patent No. 3,976,570 Dated August 24, 1976

Inventor(s) Arthur W. McCray

It is certified that error appears in the above-identified patent and that said Letters Patent are hereby corrected as shown below:

Abstract, line 3, "member" should be --members--;
line 9, "herein" should be --therein--.
Col. 1, line 14, "waters" should be --wastes--;
line 54, "urface" should be --surface--.
Col. 4, line 5, after "tube" insert --50--.
Col. 5, line 38, after "18" delete "is".

Signed and Sealed this

Eleventh Day of January 1977

[SEAL]

*Attest:*

RUTH C. MASON
*Attesting Officer*

C. MARSHALL DANN
*Commissioner of Patents and Trademarks*